UNITED STATES PATENT OFFICE 2,419,506

ALKYL AND HYDROXYALKYL NITRO AMINES AND PROCESS FOR PREPARING THEM

Murray Senkus, Terre Haute, Ind., assignor to Commercial Solvents Corporation, Terre Haute, Ind., a corporation of Maryland No Drawing. Application February 26, 1945,
Serial No. 579,894

10 Claims. (Cl. 260—584)

My invention relates to new nitro amines and to a process for the preparation thereof. Specifically, these new compounds may be represented by the following structural formula:

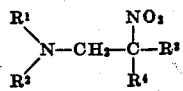

in which $R^1$ may represent hydrogen, alkyl or hydroxyalkyl, $R^2$ represents either alkyl or hydroxyalkyl, and $R^3$ and $R^4$ represent alkyl groups.

As examples of nitro amines coming within the scope of the above formula there may be mentioned the following: 2-nitro-2-methyl-1-methylaminopropane; 2-nitro-1-isopropylamino-2-methylpropane; 2-nitro-1-butylamino-2-methylpropane; N-(2-nitroisobutyl)-1-methylpropylamine; 2-nitro-1-isopropylamino-2-methylbutane; N-(2-nitroisobutyl)-1-methylheptylamine; N-(2-nitroisobutyl)-2-ethylhexylamine; 2-nitro-2-methyl-1-octadecylaminopropane; 2-nitro-1-dimethylamino-2-methylpropane; 2-nitro-1-dimethylamino-2-methylbutane; 2-nitro-1-dibutylamino-2-methylpropane; N-(2-nitroisobutyl)-bis(2-ethylhexylamine); N-(2-nitroisobutyl)2-amino-2-methyl-1-propanol; N-(2-nitroisobutyl)-2-amino-1-butanol; N-(2-nitroisobutyl)-bis(2-hydroxyethylamine), and the like.

This application is a continuation-in-part of my co-pending application, Serial No. 455,931 filed August 24, 1942.

Prior investigators in this field have found that primary nitroparaffins would react with N-(hydroxymethyl) dialkylamines; however, they also arrived at the conclusion, while making the aforesaid discovery, that N-(hydroxymethyl) monoalkylamines would not react with primary nitroparaffins, and that secondary nitroparaffins would neither react with N-hydroxymethyl mono- nor dialkylamines under any of the experimental conditions which they had found to be effective in condensing a primary nitroparaffin with N-(hydroxymethyl) dialkylamines. Previous workers also were of the opinion, in view of their own experimental results, that neither primary nor secondary nitroparaffins would react with condensation products derivable from formaldehyde and ammonia, formaldehyde and primary alkylamines, formaldehyde and aniline, formaldehyde and diphenylamine, formaldehyde and N-methylaniline, and numerous other products of similar structure prepared from higher molecular weight aldehydes and primary or secondary amines.

Contrary to that which would normally be expected in view of the above prior art findings, however, I have discovered that nitro amines of the type described may be prepared by reacting formaldehyde with a primary or secondary amine to form the corresponding N-(hydroxymethyl) mono-, or dialkyl- or dihydroxyalkylamine, which is in turn reacted with an equimolecular amount of a secondary nitroparaffin to produce a nitro amine of the type represented by the generic formula given above.

A modification of the above procedure may frequently be employed to advantage, and consists of reacting the desired amine with a suitable nitro alcohol. A solvent may be used if desired, but in general it will be found that a homogeneous solution can be obtained by agitating the mixture of amine and nitro alcohol. The products, produced by this process are identical with those synthesized by the first mentioned method; however, the mechanism of the reaction in its initial stages is materially different from that involved in the first procedure. In this connection, it has been observed that primary nitro alcohols, when in the presence of a substance appreciably basic in character, decompose into formaldehyde and the nitroparaffin from which they were derived, and in instances where the basic material happens to be a primary or secondary amine, the liberated formaldehyde reacts therewith to form an N-(hydroxymethyl) amine compound which then reacts with the nitroparaffin, produced by the decomposition of the nitro alcohol, in the same manner as described in the first procedure. The course of the reaction involved may be readily illustrated by the following series of equations.

A. 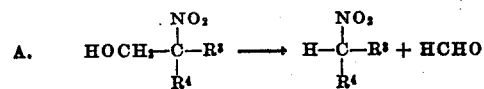

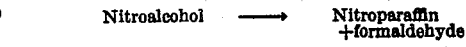

B. 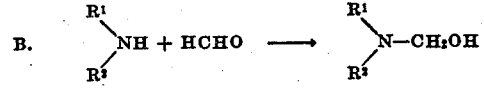

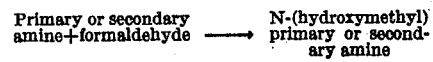

C. 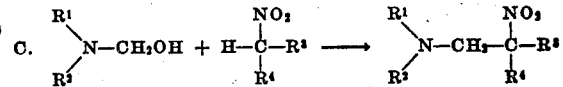

From an examination of the above series of equations, it will be evident that although the starting materials are different from those used in the process first described, both procedures may be considered equivalents of one another, since the compounds employed as starting materials in the first process are produced as intermediates in the second, after which said intermediates react in a manner identical with the mechanism involved, in the reaction forming the basis of the first mentioned method. Therefore, it is to be specifically understood that the appended process claims include both methods.

The preparation of these nitro amines by either of the above-mentioned methods, is preferably effected at temperatures of from about 25°–30° C. Temperatures above this range may be used, but in doing so care should be exercised to avoid temperatures which cause the formaldehyde to be volatilized from the reaction mixture. In some cases it may be desirable to carry out the reaction in a high pressure reaction vessel. Under such circumstances, substantially higher temperatures may be utilized without loss of formaldehyde, and decomposition of the reactants, or the reaction products.

The amines which may be employed in preparing these new compositions of matter are represented by the formula:

wherein $R^1$ may be either hydrogen, alkyl or hydroxyalkyl, and $R^2$ may be alkyl or hydroxyalkyl. As examples of such amines there may be mentioned ethylamine, butylamine, dimethylamine, methylamine, isopropylamine, 1-methylheptylamine, 2-ethylhexylamine, 2-amino-2-methyl-1-propanol, 2-amino-1-butanol, dibutylamine, bis(2-ethylhexyl)amine, ethanolamine, diethanolamine, 2-amino-2-ethyl-1-propanol, 2-amino-2-methyl-1-hexanol, and the like.

Nitroparaffins that are operative in my process may be represented by the following formula:

wherein $R^3$ and $R^4$ represent alkyl radicals.

Nitroparaffins typical of this class are 2-nitropropane, 2-nitrobutane, 2-nitropentane, and the like.

In the reaction wherein nitro alcohols are employed instead of a nitroparaffin and formaldehyde, the following are examples of typical nitro alcohols which may be utilized: 2-nitro-2-methyl-1-propanol, 2-nitro-2-methyl-1-butanol, 2-nitro-2-ethyl-1-pentanol, 2-nitro-2-ethyl-1-butanol, and the like.

The examples which follow are illustrative of the various types of nitro amines that come within the scope of the present invention. The examples are likewise illustrative of the procedures by which said products may be synthesized. It is to be specifically understood, however, that the following examples in no way limit the scope of my invention with respect to either the product or the process, since I have found that the reaction involved is very general in nature, and will occur, under the conditions described, when reacting substantially any secondary nitroparaffin with a primary or secondary amine of the various types enumerated above.

EXAMPLE I

One hundred and eighteen parts of isopropylamine was placed in a suitable 3-necked reaction vessel fitted with a condenser, a sealed stirrer, a dropping funnel, and a thermometer well reaching into the liquid. Sixty parts of a 35 per cent aqueous formaldehyde solution was added slowly to the reaction vessel while the mixture was agitated. The temperature of the mixture was not allowed to exceed 25° C. during the period of the addition of the aldehyde. One hundred and seventy-eight parts of 2-nitropropane was then added to the reaction vessel, and the mixture stirred for 30 minutes without further cooling. Twenty parts of sodium sulfate was next added to the mixture, and stirring continued until the salt had dissolved. The non-aqueous layer was removed from the crude reaction mixture, and allowed to stand at room temperature, whereupon a small additional amount of water separated from the crude product. Fractional distillation of the product yielded 242 parts of substantially pure N-isopropyl-2-nitroisobutylamine, boiling at 85° C. (10 mm.)

EXAMPLE II

Fifty-nine parts of isopropylamine and 119 parts of 2-nitro-2-methyl-1-propanol were placed in a reaction vessel and hermetically sealed. This mixture was then stirred until it had become homogeneous, after which the resulting solution was allowed to stand at room temperature. After approximately 10 hours, an aqueous lower layer appeared and when the separation of the water had discontinued, the upper layer containing the crude nitro amine, was separated and distilled under reduced pressure. One hundred and sixty parts of N-isopropyl-2-nitroisobutylamine, boiling at 85° C. (10 mm.) was obtained in this manner, corresponding to a yield of 86 per cent.

EXAMPLE III

To a mixture consisting of 218 parts of isopropylamine and 60 parts of a 35 per cent aqueous formaldehyde solution, was added 206 parts of 2-nitrobutane, in accordance with the procedure described in Example I. After all of the 2-nitrobutane had been added, 30 parts of sodium sulfate was introduced, and the resulting mixture stirred until the salt dissolved. The crude product separated as an oil, and after being removed, was distilled and the portion, boiling at 95°–97° C. (10 mm.) collected. The N-(2-nitro-2-methylbutyl)isopropylamine, thus obtained amounted to a conversion of 90 per cent on the basis of the 2-nitrobutane used.

EXAMPLE IV

Two moles of 2-amino-2-methyl-1-propanol were placed in a three-necked reaction flask fitted with a condenser, a sealed stirrer, a dropping funnel, and a thermometer reaching into the liquid. Two moles of 36% by weight aqueous formaldehyde were added slowly to the amine in the vessel while the mixture was agitated. The temperature of the mixture was maintained at about 25° C. during the addition of the aldehyde. Two moles of 2-nitropropane were added to the mixture during agitation over a period of about 30 minutes Twenty grams of sodium sulfate were then added to the reaction mixture and stirring was continued until the salt had dissolved. Two liquid layers separated and the non-aqueous layer was separated from the water layer. After standing for several days the mixture was filtered and the filtrate fractionated to yield 282 parts of N-(2-nitroisobutyl)-2-amino-2-methyl-1-propanol corresponding to a conversion of 90%. The nitrogen content found was 14.84% as compared to a calculated value of 14.74%. The product was a solid having a melting point of 59.0° C.

EXAMPLE V

Two moles of 2-amino-1-butanol were placed in a three-necked reaction flask fitted with a condenser, a sealed stirrer, a dropping funnel, and a thermometer reaching into the liquid. Two moles of 36% by weight aqueous formaldehyde were added slowly to the amine in the vessel while the mixture was agitated. The temperature of the mixture was maintained at about 25° C. during the addition of the aldehyde. Two moles of 2-nitropropane were added to the mixture during agitation over a period of about 30 minutes. Twenty grams of sodium sulfate were then added to the reaction mixture and stirring was continued until the salt had dissolved. Two liquid layers separated and the non-aqueous layer was separated from the water layer. After standing for several days the mixture was filtered and the filtrate fractionated to yield 38 parts of N-(2-nitroisobutyl)-2-amino-1-butanol corresponding to a conversion of 10%. The nitrogen content found was 14.49% as compared to a calculated value of 14.74%. The product was a solid having a melting point of 59.1° C.

EXAMPLE VI

One mole of diethanolamine and one mole of 2-nitro-2-methyl-1-propanol were placed in a glass-stoppered reaction vessel and the mixture was shaken until it had become homogeneous. The solution was allowed to stand at room temperature. Water began to separate as a lower layer after about 10 hours and the separation of water had ceased after about 3 days. Two liquid layers formed and were separated, N-(2-nitroisobutyl)-bis(2-hydroxymethylamine) being in the top non-aqueous layer. The product was not purified as it decomposed on distillation. The crude product was hydrogenated and converted to N-(2-aminoisobutyl)-bis(2-hydroxymethylamine) in a conversion of 25% based on the starting nitroalcohol. The nitrogen content found was 15.86% as compared to a calculated value of 15.09%. The product boiled at 140° C. at 1 mm. pressure and had an $n_D^{20}$ of 1.4888 and $$d_{20}^{02}$$

of 1.0338.

The table appearing below gives additional examples of nitroamines prepared according to one or the other of the alternative methods described and listed in the examples given above. The nitroamines indicated as having been prepared by method A were prepared by the method of Example I utilizing an amine with a nitroparaffin and formaldehyde, whereas those indicated as being prepared by Method B were prepared by the method of Example II utilizing equimolecular proportions of the indicated amine and nitroalcohol.

TABLE I

Preparation of nitro amines of the type 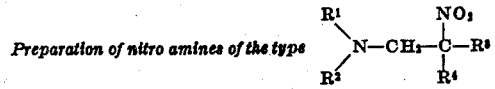

| Starting Materials | | Product | Conversion, per cent | Method of Prep. | N Content | | Boiling Point, ° C. (mm.) | $n_D^{30}$ | $d_{30}^{25}$ |
| --- | --- | --- | --- | --- | --- | --- | --- | --- | --- |
| Amine | Nitroparaffin | | | | Calc'd, per cent | Found, per cent | | | |
| *Formaldehyde* | | | | | | | | | |
| Methylamine | 2-Nitropropane | 2-Nitro-2-methyl-1-methylaminopropane. | 48 | A | 21.21 | 21.02 | 60–62 (6) | 1.4368 | 1.0166 |
| Isopropylamine | do | 2-Nitro-1-isopropylamino-2-methylpropane. | 76 / 86 | A / B | 17.50 | 17.34 | 84.0 (10) | 1.4339 | 0.9685 |
| 1-Butylamine | do | 2-Nitro-1-butylamino-2-methylpropane. | 85 | A | 16.09 | 16.17 | 105–107 (10) | 1.4407 | 0.9584 |
| 2-Butylamine | do | N-(2-nitroisobutyl)-1-methylpropylamine. | 72 | A | 16.09 | 15.95 | 96.0 (10) | 1.4384 | 0.9571 |
| Isopropylamine | 2-Nitrobutane | 2-Nitro-1-isopropylamino-2-methylbutane. | 90 | A | 16.09 | 16.09 | 95–97 (10) | 1.4409 | 0.9625 |
| 1-Methylheptylamine | 2-Nitropropane | N-(2-nitroisobutyl)-1-methylheptylamine. | 78 | B | 12.18 | 12.36 | 110–112 (0.5) | 1.4465 | 0.9205 |
| 2-Ethylhexylamine | do | N-(2-nitroisobutyl)-2-ethylhexylamine. | 67 | B | 12.18 | 12.34 | 100–101 (1) | 1.4486 | 0.9281 |
| Octadecylamine | do | 2-Nitro-2-methyl-1-octadecylaminopropane. | 90 | B | [1] 11.67 | [1] 11.39 | 84.4 [1],[2] | | |
| 2-Amino-2-methyl-1-propanol | do | N-(2-nitroisobutyl)-2-amino-2-methyl-1-propanol. | 90 | A | 14.74 | 14.84 | 59.0 [2] | | |
| 2-Amino-1-butanol | do | N-(2-nitroisobutyl)-2-amino-1-butanol. | 10 | A | 14.74 | 14.49 | 58.1 [2] | | |
| Dimethylamine | do | 2-Nitro-1-dimethylamino-2-methylpropane. | 74 / 73 | A / B | 19.18 | 19.05 | 65–66 (10) | 1.4330 | 0.9784 |
| Do | 2-Nitrobutane | 2-Nitro-1-dimethylamino-2-methylbutane. | 76 | B | 17.50 | 17.71 | 64 (3) | 1.4410 | 0.9772 |
| Dibutylamine | 2-Nitropropane | 2-Nitro-1-dibutylamino-2-methylpropane. | 64 / 63 | A / B | 12.18 | 12.38 | 135 (10) | 1.4453 | 0.9180 |
| Bis(2-ethylhexyl) amine | do | N-(2-nitroisobutyl)-bis(2-ethylhexylamine). | | | | | | | |

[1] Data for picrate.
[2] Melting point.

Method A utilizes amine, nitroparaffin and formaldehyde.
Method B utilizes amine and nitroalcohol.

Having now described my invention, what I claim is:

1. In a process for the preparation of nitro amines of the formula

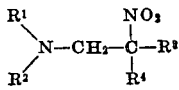

wherein $R^1$ represents a member selected from the group consisting of hydrogen, alkyl and hydroxyalkyl, $R^2$ represents a member selected from the group consisting of alkyl and hydroxyalkyl, and $R^3$ and $R^4$ represent alkyl radicals, the step which comprises mixing with formaldehyde, an amine having the formula

wherein $R^1$ represents a member selected from the group consisting of hydrogen, alkyl and hydroxyalkyl and $R^2$ represents a member selected from the group consisting of alkyl and hydroxyalkyl, and a nitroalkane of the formula

wherein $R^3$ and $R^4$ represent alkyl groups.

2. In a process for the preparation of nitro amines of the formula

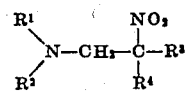

wherein $R^1$ represents a member selected from the group consisting of hydrogen, alkyl and hydroxyalkyl, $R^2$ represents a member selected from the group consisting of alkyl and hydroxyalkyl, and $R^3$ and $R^4$ represent alkyl radicals, the step which comprises mixing with formaldehyde at temperatures above about 25° C., an amine having the formula

wherein $R^1$ represents a member selected from the group consisting of hydrogen, alkyl and hydroxyalkyl and $R^2$ represents a member selected from the group consisting of alkyl and hydroxyalkyl, and a nitroalkane of the formula

wherein $R^3$ and $R^4$ represent alkyl groups.

3. In a process for the preparation of nitro amines of the formula

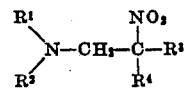

wherein $R^1$ represents a member selected from the group consisting of hydrogen, alkyl and hydroxyalkyl, $R^2$ represents a member selected from the group consisting of alkyl and hydroxyalkyl, and $R^3$ and $R^4$ represent alkyl radicals, the step which comprises mixing at temperatures above about 25° C. an amine having the formula

wherein $R^1$ represents a member selected from the group consisting of hydrogen, alkyl and hydroxyalkyl and $R^2$ represents a member selected from the group consisting of alkyl and hydroxyalkyl, and a nitroalcohol of the formula

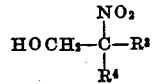

wherein $R^3$ and $R^4$ represent alkyl groups.

4. A process for the preparation of N-isopropyl-2-nitro-isobutylamine, which comprises mixing isopropylamine with formaldehyde, and thereafter mixing the resulting product with 2-nitropropane.

5. A process for the preparation of N-(2-nitro-2-methylbutyl)isopropylamine, which comprises mixing isopropylamine with formaldehyde, and thereafter mixing the resulting product with 2-nitrobutane.

6. In a process for preparing N-(2-nitroisobutyl)-2-amino-2-methyl-1-propanol, the step which comprises mixing 2-amino-2-methyl-1-propanol, formaldehyde and 2-nitropropane.

7. Nitro amines having the following structural formula

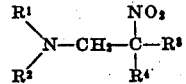

wherein $R^1$ represents a member selected from the group consisting of hydrogen, alkyl and hydroxyalkyl, $R^2$ represents a member selected from the group consisting of alkyl and hydroxyalkyl, and $R^3$ and $R^4$ represent alkyl radicals.

8. N-isopropyl-2-nitroisobutylamine.

9. N-(2-nitro-2-methylbutyl)isopropylamine.

10. N-(2-nitroisobutyl) - 2 - amino-2-methyl-1-propanol.

MURRAY SENKUS.

REFERENCES CITED

The following references are of record in the file of this patent:

UNITED STATES PATENTS

| Number | Name | Date |
|---|---|---|
| 2,206,885 | Dickey | July 9, 1940 |
| 2,253,082 | McNally | Aug. 19, 1941 |

OTHER REFERENCES

De Mauny, "Bull. Soc. Chim. de France (5), 4 (1937), pp. 1451–68. (Copy in Patent Office Library.)

Certificate of Correction

Patent No. 2,419,506.   April 22, 1947.

MURRAY SENKUS

It is hereby certified that error appears in the printed specification of the above numbered patent requiring correction as follows: Column 6, lines 22, 23 and 24, for "$d_{20}^{02}$" read $d_{20}^{20}$; and that the said Letters patent should be read with this correction therein that the same may conform to the record of the case in the Patent Office.

Signed and sealed this 29th day of July, A. D. 1947.

[SEAL]

LESLIE FRAZER,
*First Assistant Commissioner of Patents.*